(12) United States Patent
Koppauer et al.

(10) Patent No.: US 11,448,099 B2
(45) Date of Patent: Sep. 20, 2022

(54) CONTROL CIRCUIT FOR WASTE HEAT RECOVERY SYSTEMS

(71) Applicant: Robert Bosch GmbH, Stuttgart (DE)

(72) Inventors: Herwig Koppauer, Linz (AT);
Andreas Kugi, Vienna (AT); Wolfgang Kemmetmueller, Vienna (AT);
Christian Fleck, Gerlingen (DE);
Matthias Bitzer, Stuttgart (DE);
Adrian Trachte, Stuttgart (DE);
Carolina Passenberg, Rutesheim (DE);
Derya Lindenmeier, Rutesheim (DE);
Thomas Specker, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 16/976,178

(22) PCT Filed: Feb. 26, 2019

(86) PCT No.: PCT/EP2019/054654
§ 371 (c)(1),
(2) Date: Aug. 27, 2020

(87) PCT Pub. No.: WO2019/166391
PCT Pub. Date: Sep. 6, 2019

(65) Prior Publication Data
US 2020/0408112 A1    Dec. 31, 2020

(30) Foreign Application Priority Data

Feb. 27, 2018  (DE) ...................... 10 2018 202 919.9

(51) Int. Cl.
*F01K 23/06* (2006.01)
*F02G 5/02* (2006.01)
(Continued)

(52) U.S. Cl.
CPC .............. *F01K 23/065* (2013.01); *F02G 5/02* (2013.01); *F01K 23/101* (2013.01);
(Continued)

(58) Field of Classification Search
CPC ...... F01K 23/065; F01K 23/101; F01K 13/02; G02G 5/02; F01N 5/02; F01N 9/00;
(Continued)

(56) References Cited

U.S. PATENT DOCUMENTS 10,094,246 B2 * 10/2018  Zhou ......................... F01N 5/02
10,704,697 B2 *  7/2020  Schwaderer .......... F16K 11/056
(Continued)

FOREIGN PATENT DOCUMENTS

DE    102010019718    11/2011
DE    102014019684     6/2015
(Continued)

OTHER PUBLICATIONS

International Search Report for Application No. PCT/EP2018/054654 dated Jul. 2, 2019 (English Translation, 3 pages).

*Primary Examiner* — Audrey B. Walter
*Assistant Examiner* — Dapinder Singh
(74) *Attorney, Agent, or Firm* — Michael Best & Friedrich LLP

(57) ABSTRACT

The invention relates to a control circuit (27) for a waste heat recovery system (2) for a heat engine (36). The waste heat recovery system (2) comprises at least one evaporator (21) for converting waste heat from the exhaust gas (31, 31a) generated by the heat engine (36) into a working medium (23), at least one expansion machine (24) which can be driven by the working medium (23), at least one condenser (25) for condensing the working medium (23a) expanded in the expansion machine (24) into the liquid state (23b), and at least one conveying device (26) for increasing the pres- (Continued)

sure of the condensed working medium (23*b*) and conveying same into the evaporator (21). The control circuit (27) influences at least one control variable which controls the energy transmission from the exhaust gas (31, 31*a*) to the working medium (23*b*) and/or the energy transmission from the working medium (23*c*) to the expansion machine (24). The control circuit (27) is designed to regulate the specific enthalpy $h_W$ and/or the temperature $T_W$ of the working medium (23*c*) entering the expansion machine (24) to a target value $h_{W,S}$, $T_{W,S}$, wherein the target value $h_{W,S}$, $T_{W,S}$ depends on the pressure $p_W$ of the working medium (23*c*) entering the expansion machine (24). The invention also relates to a waste heat recovery system (2) for an internal combustion engine of a vehicle (3) in the form of a heat engine (36) comprising the control circuit (27) and to a corresponding computer program.

14 Claims, 4 Drawing Sheets

(51) Int. Cl.
*F01K 23/10* (2006.01)
*F02D 41/14* (2006.01)

(52) U.S. Cl.
CPC ...... *F01N 2560/06* (2013.01); *F01N 2900/10* (2013.01); *F02D 2041/1412* (2013.01)

(58) Field of Classification Search
CPC ............. F01N 2560/06; F01N 2900/10; F02D 2041/1412; Y02E 20/14; Y02T 10/12; Y02T 10/40
See application file for complete search history.

(56) References Cited

U.S. PATENT DOCUMENTS

| | | |
|---|---|---|
| 2005/0247056 A1* | 11/2005 | Cogswell ................ F01K 13/02 60/531 |
| 2009/0211253 A1* | 8/2009 | Radcliff ................ F01K 23/065 60/670 |
| 2011/0203278 A1 | 8/2011 | Kopecek et al. |
| 2014/0165562 A1 | 6/2014 | Nagai et al. |
| 2014/0224469 A1 | 8/2014 | Mirmobin et al. |
| 2017/0016356 A1 | 1/2017 | Seo |
| 2017/0074122 A1* | 3/2017 | Versteyhe ............. F01K 23/065 |

FOREIGN PATENT DOCUMENTS

| | | |
|---|---|---|
| WO | 2015143280 | 9/2015 |
| WO | 2016089285 | 6/2016 |

* cited by examiner

CONTROL CIRCUIT FOR WASTE HEAT RECOVERY SYSTEMS

BACKGROUND OF THE INVENTION

The present invention relates to a control circuit with which the efficiency of waste heat recovery systems for heat engines, in particular for internal combustion engines in vehicles, can be improved.

In a motor vehicle, most of the energy supplied to the internal combustion engine is currently lost via waste heat. The majority of this waste heat is discharged from the vehicle via the cooling circuit and with the exhaust gas. Various systems are known, with which some of this waste heat can be converted into a usable energy form.

WO 2016/089 285 A1 discloses a system which removes the waste heat from the exhaust gas via a thermoelectric generator and converts it into electric energy, and a optimization method for the associated overall efficiency.

DE 10 2014 019 684 A1 discloses an alternative system, which removes waste heat from the cooling circuit of the internal combustion engine and transfers it to a working medium which then performs mechanical work in an expansion machine.

The system disclosed in US 2017/016 356 A1 is also of a similar type. In this case, the waste heat is removed from the exhaust gas and, depending on the operating state of the vehicle, either only one of two available heat exchangers is used or both heat exchangers are used, so that the efficiency of the energy conversion is always optimal.

SUMMARY OF THE INVENTION

Within the scope of the invention, a control circuit for a waste heat recovery system for a heat engine has been developed. In this case, the waste heat recovery system comprises at least one evaporator for converting waste heat from the exhaust gas generated by the heat engine into a working medium, at least one expansion machine, which can be driven by the working medium, at least one condenser for condensing the working medium expanded in the expansion machine into the liquid state and at least one delivery device for increasing the pressure of the condensed working medium and delivering it into the evaporator.

The control circuit influences at least one control variable which controls the energy transfer from the exhaust gas to the working medium and/or the energy transfer from the working medium to the expansion machine. In this case, the control variable particularly preferably controls the mass flow rate mw of the condensed working medium into the evaporator, for example via the delivery rate of the delivery device. If this mass flow rate mw is varied, then, at the same time, both the energy transfer from the exhaust gas to the working medium and the energy transfer from the working medium to the expansion machine are thereby altered. At the same time, this measure, in itself, does not yet result in energy from the exhaust gas or from the working medium being released unused to the environment.

However, as an alternative or also in combination, the control circuit can, for example, influence the position of at least one valve which guides all or some of the exhaust gas past the evaporator, and/or, can influence the position of at least one valve which guides all or some of the working medium past the expansion machine as a control variable. By influencing the positions of such bypass valves, particularly rapid interventions can be undertaken to counter impending violation of boundary conditions. For example, in the waste heat recovery system, it is possible to specify a maximum pressure of the working medium, above which there is a threat of damage to tanks and lines of the system, or a maximum temperature of the working medium, above which there is a threat of the working medium degrading. Furthermore, by way of example, a turbine as an expansion machine requires a minimum steam quality, i.e. the steam of the working medium must be present substantially in the gas phase and must contain either no droplets or only droplets below a certain critical size. Since droplets have a higher density than steam, they can rapidly lead to significant wear on the turbine.

The bypass valves can be, for example, simple 3/2-way valves, which conduct the exhaust gas flow or the flow of working medium to one of two paths. However, they can also be, for example, proportional valves or other valves with which the percentage distribution to the two paths is infinitely variable.

Even brief violation of the said boundary conditions can cause damage to the waste heat recovery system. It is therefore important to quickly counter impending violations. It is then of secondary importance that, for example by releasing exhaust gas directly to the environment, avoiding the evaporator, waste heat of the heat engine escapes unused, or, for example by expanding the working medium at a site other than in the expansion machine, the energy firstly absorbed by the working medium likewise remains unused.

The control circuit is designed to regulate the specific enthalpy $h_W$ and/or the temperature $T_W$ of the working medium entering the expansion machine to a set value $h_{W,S}$, $T_{W,S}$, wherein the set value $h_{W,S}$, $T_{W,S}$ depends on the pressure $p_W$ of the working medium entering the expansion machine. The specific enthalpy $h_W$ can be specified, for example, as enthalpy per unit volume or mass of the working medium.

It has been recognized that, for example with water as the working medium, for each pressure $p_W$, a threshold value exists for the specific enthalpy $h_W$ or for the temperature $T_W$, above which the working medium is reliably present as a droplet-free superheated steam. Therefore, in the plot of $h_W(p_W)$, or $T_W(p_W)$, a limit curve can be specified, above which the boundary condition for the steam quality is fulfilled in any event. In the region above the limit curve, $h_W$, or $T_W$, can be freely varied with the purpose of using the highest possible proportion of the energy contained in the exhaust gas of the heat machine. Therefore, greater efficiency can be achieved by precise regulation to optimal state variables.

Furthermore, in wide operating ranges, steam with too low a steam quality can be prevented from entering the expansion machine, upon which the working medium would have to be diverted into a bypass throttle by a bypass valve. After the expansion of working medium in the bypass throttle, the energy which was previously used for compression in the evaporator is lost and reduces the overall efficiency.

The monitoring of the maximum temperature $T_W$, or the maximum pressure $p_W$, of the working medium, for example, does not necessarily have to take place via the control circuit, but can also be outsourced, for example, to a separate monitoring device. This monitoring device can control one of the said bypass valves, for example, and counter any impending violation of the boundary condition in that energy is quickly removed from the system. The actual control circuit is then less complex, at the price of the energy being discharged unused by the monitoring device at the expense of overall efficiency.

Analogously, the temperature or the specific enthalpy can optionally also be additionally regulated on the low-pressure side after passing through the expansion machine.

The control circuit is particularly advantageously coupled to a performance optimizer, which is designed to determine the dependence of the set value $h_{W,S}$, $T_{W,S}$ on the pressure $p_W$ from optimal stationary operating points of the waste heat recovery system. "Optimal" here relates to the net output, or the efficiency, of the waste heat recovery system. In this case, the determination of $h_{W,S}$, or of $T_{W,S}$, with respect to a given pressure $p_W$ can take place in any manner. For example, an experimentally determined characteristic map or a model of the waste heat recovery system can be stored in a performance optimizer.

The performance optimizer is advantageously designed to associate a stationary working point of the waste heat recovery system which has an optimal efficiency with a set of state variables of the heat engine from which at least the temperature $T_A$ and the mass flow rate $m_A$ of the exhaust gas at the site of the evaporator arise. In actual application, the heat engine fulfills a primary function, the requirements of which govern its load state. The load state in turn manifests itself in the temperature $T_A$ and in the mass flow rate $m_A$ of the exhaust gas at the site of the evaporator. By way of example, the load state of the internal combustion engine in a vehicle depends substantially on the traffic situation.

In the control circuit, the deviation of the specific enthalpy $h_W$ or the temperature $T_W$ from the set value $h_W$, s or $T_W$, s represents the primary control deviation. However, the adjustment of this primary control deviation does not have to be the sole aim of the control circuit.

By way of example, a proportion of the exhaust gas which is not conducted through the evaporator can act as a further control deviation. The smaller this proportion, the smaller the proportion of the waste heat produced by the heat engine which is not even transferred to the waste heat recovery system. Suitable weighting of this control deviation enables the desired superheating of the vaporous working medium to be adjusted, for example, when the maximum high pressure is reached. Greater superheating results in a somewhat greater turbine output and stores more thermal energy in the system, which offers greater security against too low a steam quality arising.

By way of example, a frequency and/or an intensity of control interventions of the control circuit can act as a further control deviation. The control energy for the control can thus be reduced and/or the components used for the control interventions can be protected. Furthermore, by restricting the control interventions to those which are necessary, needless excitation of the waste heat recovery system to forced vibration is suppressed in the state variables.

By way of example, a control deviation of the specific enthalpy $h_W$, or the temperature $T_W$, from the set value $h_{W,S}$, or $T_{W,S}$, which exceeds a predetermined threshold value can act as a further control deviation and therefore be especially "penalized". For example, it is thus also possible to weaken an inequality condition in such a way that the specific enthalpy $h_W$, or the temperature $T_W$, should be above the set value $h_{W,S}$ or $T_{W,S}$, so that an optimization task for the control variables of the control circuit will always have at least one solution. As a result of the "penalization", it is ensured that the waste heat recovery system, as quickly as possible, again aims for a state in which the inequality condition is fulfilled again. It has been recognized that brief violations of the said inequality condition, and therefore the requirements relating to the steam quality of the expansion machine, do not result directly in the failure of the waste heat recovery system. Instead, these violations are a "cumulative poison" which should be substantially avoided, but which can be tolerated in individual cases. On the other hand, exceeding a maximum temperature $T_W$, or a maximum pressure $p_W$, of the working medium can result directly in damage.

The said additional control deviations can be combined, in particular, in a common cost function of the control circuit, wherein the different significances of the respective aspects can be represented via weighting factors, for example.

In a further particularly advantageous configuration, a prediction module is provided, which is designed to precalculate the future development of the specific enthalpy $h_W$, the temperature $T_W$, or the pressure $p_W$, on the basis of a model and at least one set of state variables of the waste heat recovery system. The prediction module can, for example, also be advantageously capable of precalculating the future development of the pressure $p_W$, or also further state variables.

As mentioned above, in a waste heat recovery system, there are also "hard" boundary conditions which must not be even briefly violated. With the threat of such a violation, as a last consequence, energy should be removed from the system, for example by activating one of the said bypass valves. The greater the success in avoiding control interventions of this type, the smaller the amount of energy from the waste heat of the heat engine which remains unused.

A control intervention via the mass flow rate mw of the working medium which represents the preferred control variable does not in itself result in energy remaining unused. However, such an intervention only acts with a certain delay. If the future development can be precalculated, the intervention can be accelerated time-wise. All in all, a high proportion of the control interventions can be implemented with measures which do not "cost" energy.

The model can be, for example, a nonlinear mathematical model of the high pressure part or, in an expanded form, the closed cyclic process consisting of a high pressure and low pressure part of the waste heat recovery system, which can have, for example, the form:

$$\dot{x} = f(x, u, v).$$

In this, x are the system states, u the control variables for the control and v the exogenous input variables. The system states are the pressure $p_W$, the specific enthalpies of the working medium along the evaporator and in the pipes, the temperatures of the exhaust gas along the evaporator, the temperatures along the partition wall of the evaporator between the exhaust gas and the working medium and the temperatures of the pipe walls. By way of example, the mass flow rate mw of the working medium and the position of a bypass valve which guides all or some of the exhaust gas past the evaporator can be used as control variables u.

Even when a second bypass valve is additionally present, which guides all of some of the working medium past the expansion machine, it is advantageous to only use this for emergencies to prevent violation of system restrictions and not for normal control interventions: it is more effective to not admit excess heat into the waste heat recovery system in the first place by diverting the exhaust gas than it is to allow the working medium to expand via a bypass throttle.

The exogenous input variables v when using a mathematical model for the high pressure part are the specific enthalpy of the working medium upon entry into the evaporator, the temperature $T_A$ of the exhaust gas upon entry into the evaporator, the mass flow rate $m_A$ of the exhaust gas into the evaporator, the ambient temperature and the low pressure of the working medium after exiting the expansion machine. When using a mathematical model for the entire cyclic process including the low pressure part, the exogenous input variables v are the temperature $T_A$ of the exhaust gas upon entry into the evaporator, the mass flow rate $m_A$ of the exhaust gas into the evaporator, the entry temperature $T_K$ of the cooling medium into the condenser, the mass flow rate MK of the cooling medium through the condenser and the ambient temperature.

The model can be obtained, for example, from mass and energy balance equations for the individual components of the waste heat recovery system. To reduce the calculation complexity, a quasi-stationary approach can be used, for example, which eliminates all system states which can be associated with rapid system dynamics which are not relevant for the control circuit.

In a particularly advantageous configuration, the control circuit is designed to plan future control interventions within a time control horizon $T_{ch}$ in such a way that control deviations to be expected at a time which is a prediction horizon $T_{ph} > T_{ch}$ in the future are minimized. The distinction between the control horizon $T_{ch}$ and the longer prediction horizon $T_{ph}$ simplifies the self-consistent calculation of the sought state variables at the end of the prediction horizon $T_{ph}$ with the model of the waste heat recovery system, which can be present, for example, as a differential equation or as a difference equation. This distinction furthermore also results in a temporal smoothing of the control interventions and reduces the susceptibility of the state variables to be excited to forced vibrations by the control interventions.

With the model-predictive control, a dynamic (i.e. time-dependent) predictive optimal control problem is therefore solved recursively as a function of the current system state.

Both the control horizon $T_{ch}$ and the prediction horizon $T_{ph}$ are particularly advantageously defined as multiples of a sampling time $T_S$, wherein the sampling time $T_S$ decreases with the increasing pressure $p_W$. The time constant of the waste heat recovery system alters significantly depending on the operating point. In particular, the system dynamics become ever faster at higher pressures. If the prediction horizon $T_{ph}$ now scales with the sampling time $T_S$, a constant number of prediction steps can be used, wherein the system dynamics always remain covered. For example, the system can always be sampled for the fastest occurring sampling time and the current sampling time can then always be selected as a multiple thereof.

In a particularly advantageous configuration, the model is linearized around at least one stationary operating point of the waste heat recovery system. The computing effort for precalculating the state variables can thus be considerably reduced. This is particularly advantageous for applications of waste heat recovery systems in vehicles, in which the task has to be accomplished with the comparatively limited computing power of control devices.

Stationary working points $x_0, u_0, v_0, h_{W,0}$ can be obtained, for example, as solutions of the equation system $$0 = f(x_0, u_0, v_0)$$

$$0 = h_{W,0} - h_{W,S}(p_W)$$

Those operating points which do not enable a solution of the equation system or violate the system restrictions (for instance with respect to the maximum high pressure) are discarded at this point.

By way of example, the model can be linearized in sections for different ranges of the pressure $p_W$. This means that, depending on the pressure $p_W$, there are different models which connect to one another. To ensure this connection, the models for all pressure ranges can be constructed in the same manner, for example. Also, for a pressure $p_W$, two or more local system approximations can be active, for example, which are offset against one another.

By way of example, quasi-linear system approximations $$\dot{x} = \Delta \dot{x} \approx f(x_0, u_0, v) + \frac{\partial f}{\partial x}(x - x_0) + \frac{\partial f}{\partial u}(u - u_0)$$

$$y = Cx_0 + C\Delta x$$

can be determined at the n nominal working points $x_0, u_0, v_0$. In this, C is given in that $Cx_0 = y_0$. $x - x_0$ is equal to $\Delta x$, analogously $u - u_0$ is equal to $\Delta u$. A: $= \partial f / \partial x$ and B: $= \partial f / \partial u$ are the Jacobian matrices, which are to be evaluated at the nominal working points $x_0, u_0, v_0$. The output variables y comprise the high pressure $p_W$ and the specific enthalpy $h_W$ of the working medium upon entry into the expansion machine and also the specific enthalpy of the working medium at the exit from the evaporator. Subsequently, the associated time-discrete systems with the sampling time $T_S$ can be determined as $$\Delta x_{k+1} = \Phi \Delta x_k + \Gamma \Delta u_k + N'_k$$

$$y_k = Cx_0 + C\Delta x_k$$

$$\Phi = \exp(AT_S)$$

$$\Gamma = \int_0^{T_S} \exp(A\tau) B d\tau$$

$$N'_k = \int_0^{T_S} \exp(A\tau) f(x_0, u_0, v_k) d\tau$$

The dynamics of the nonlinear system can be approximated, for example, by a specific combination of these local system approximations in the form $$x_{k+1} = \sum_{l=1}^{n} \xi_l(p_{W,k})(x_{l,0} + \Phi_l \Delta x_{l,k} + \Gamma_l \Delta u_{l,k} + N'_{l,k})$$

$$y_k = Cx_k$$

with the validity functions $$\xi_l(P_{W,k}) = \begin{cases} 0 & \text{for} \quad P_{W,k} < P_{0,l-1} \\ \frac{P_{W,k} - P_{0,l-1}}{P_{0,l} - P_{0,l-1}} & \text{for} \quad P_{0,l-1} \leq P_{W,k} < P_{0,l} \\ \frac{P_{0,l+1} - P_{W,k}}{P_{0,l+1} - P_{0,l}} & \text{for} \quad P_{0,l} \leq P_{W,k} \leq P_{0,l+1} \\ 0 & \text{for} \quad P_{W,k} > P_{0,l+1} \end{cases}$$

In this case, $p_{0,l}$ refers to the pressure of the l-th nominal working point. As a result of the specific selection of the validity function, only two local system approximations in each case are active at one sampling time.

In a further, particularly advantageous configuration, the control circuit is coupled to a Kalman filter for estimating at least one state variable of the model from a set of measured state variables of the waste heat recovery system. The Kalman filter can be, in particular, an extended Kalman filter or an unscented Kalman filter.

The model of the waste heat recovery system can thus also use state variables which are not accessible for direct measurement. In an actual system, it is difficult to draw a conclusion relating to the non-measurable state variables based on the measurable state variables since both the active mechanisms of the system itself and the measurement of the measurable state variables are affected by noise. In particular, the unavoidable deviations between the mathematical model of the system and the actual system result in process noise. With the Kalman filter, both the dynamics of the system which are known from the model and also the previously known information that the noise is normally distributed can be used as additional information. The model can thus be refined, for example.

Examples of state variables which are not directly measurable and which further refine the model are a heat flow from the exhaust gas into the partition wall of the evaporator between the exhaust gas and the working medium and a heat loss along the pipeline between the exit from the evaporator and the entry into the expansion machine (or into a bypass valve connected upstream).

At the start of the operation, the Kalman filter can be initialized with a stationary state, for example, which arises from the existing measurement values under the assumption of a vanishing noise.

In a further particularly advantageous configuration, an optimization module is provided, which is designed to determine the future control interventions as a solution of a mathematical optimization problem with side conditions for the above-mentioned restrictions. Such an optimization problem can be present, for example, in the form of a quadratic program with quadratic restrictions. Such a quadratic program can be established, in particular, when the model is linear, at least in sections. Both the further development of the state variables and the further development of the output variables of the model are then both linear, both in the changes in state variables and in changes in control variables which act in the observed time period. The solution of a quadratic program is computationally particularly efficient, which is then particularly advantageous if the control circuit is implemented on a control device of a vehicle.

A conversion module is therefore furthermore advantageously provided, which is designed to convert boundary conditions, present in the form of inequalities, for the pressure $p_W$, for the temperature $T_W$, and/or for at least one control variable into quadratic restrictions.

The quadratic program can assume the following form, for example:

$$\min_{d}(d^T H d + k^T d)$$

so that $Gd \leq b$ with matrices H and G, vectors k and b and the optimization variables $$d=[\delta \bar{u}^T s^T]^T,$$

in which the vector $$\delta \bar{u}=[\delta u_{k|k} \delta u_{k+1|k} \ldots \delta u_{k+K-1|k}]^T$$

combines the incremental changes in the control variables within the K sampling points of the control horizon $T_{ch}$, and the slack variable $$S=[S_{k+1|k} S_{k+2|k} \ldots S_{k+P|k}]^T$$

indicates for each of the P sampling points within the prediction horizon $T_{ph}$ to what extent the inequality restriction $$h_W \geq (h_{W,S}(p_W)-\Delta h_l)1_{P \times 1}-s$$

where $$h_W=[h_{W,k+1|k} h_{W,k+2|k} \ldots h_{W,k+P|k}]^T$$

and the freely selectable parameter $\Delta h_l$ is weakened. The index k+i|k in this case denotes the respective variable at the time k+i starting from the current sampling time k.

As mentioned at the outset, in the case of comparatively small internal combustion engines which are used as a drive for vehicles, a large part of the primary energy used is lost in the form of waste heat. In contrast to stationary arrangements, there is also no option in mobile internal combustion engines to return the waste heat for further use, for example within the context of a cogeneration of heat and power. Instead, it is necessary to convert the waste heat into mechanical work or into electricity, for example via the Organic Rankine Cycle. At the same time, the available computing capacity on board a vehicle is usually limited in contrast to stationary arrangements, in which greater computing capacities are generally available for corresponding model-predictive controls. The control circuit provided according to the invention manages with the limited computing capacity and, to the greatest possible extent, enables the control to contest control interventions which do not release energy unused from the system.

Therefore, the invention also relates to a waste heat recovery system for an internal combustion engine of a vehicle as a heat engine, wherein the waste heat recovery system comprises at least one evaporator for converting waste heat from the exhaust gas generated by the internal combustion engine into a working medium, at least one expansion machine which can be driven by the working medium, at least one condenser for condensing the working medium expanded in the expansion machine into the liquid state and at least one delivery device for increasing the pressure of the condensed working medium and delivering it to the evaporator. The waste heat recovery system has a control circuit according to the invention.

In all of the above-described components of the control circuit, there is fundamentally a freedom of choice as to whether they are realized entirely or partially in the form of digital or analog electronic modules or whether they are implemented entirely or partially in the form of software which runs on a computer or on a control device. In this regard, for example, approximate calculations can be accelerated considerably by the use of analog electronics. On the other hand, the partial or entire implementation via software is advantageous in that installation space, which is often not available in the engine space of automobiles, is not required for additional hardware.

Furthermore, existing waste heat recovery systems can also be retrofitted with a software solution. A software solution is therefore a product which can be bought separately for the retrofitting market and for the OEM market.

The invention therefore also relates to a computer program containing machine-readable instructions which, when run on a computer and/or on a control device, upgrade the computer and/or the control device to a control circuit according to the invention and/or prompt it to fully or partially execute the function of a control circuit according to the invention.

BRIEF DESCRIPTION OF THE DRAWINGS

Hereinafter, further measures which improve the invention will be illustrated in more detail with the aid of figures, together with the description of the preferred exemplary embodiments of the invention.

The figures show.

DETAILED DESCRIPTION

Figure 1:
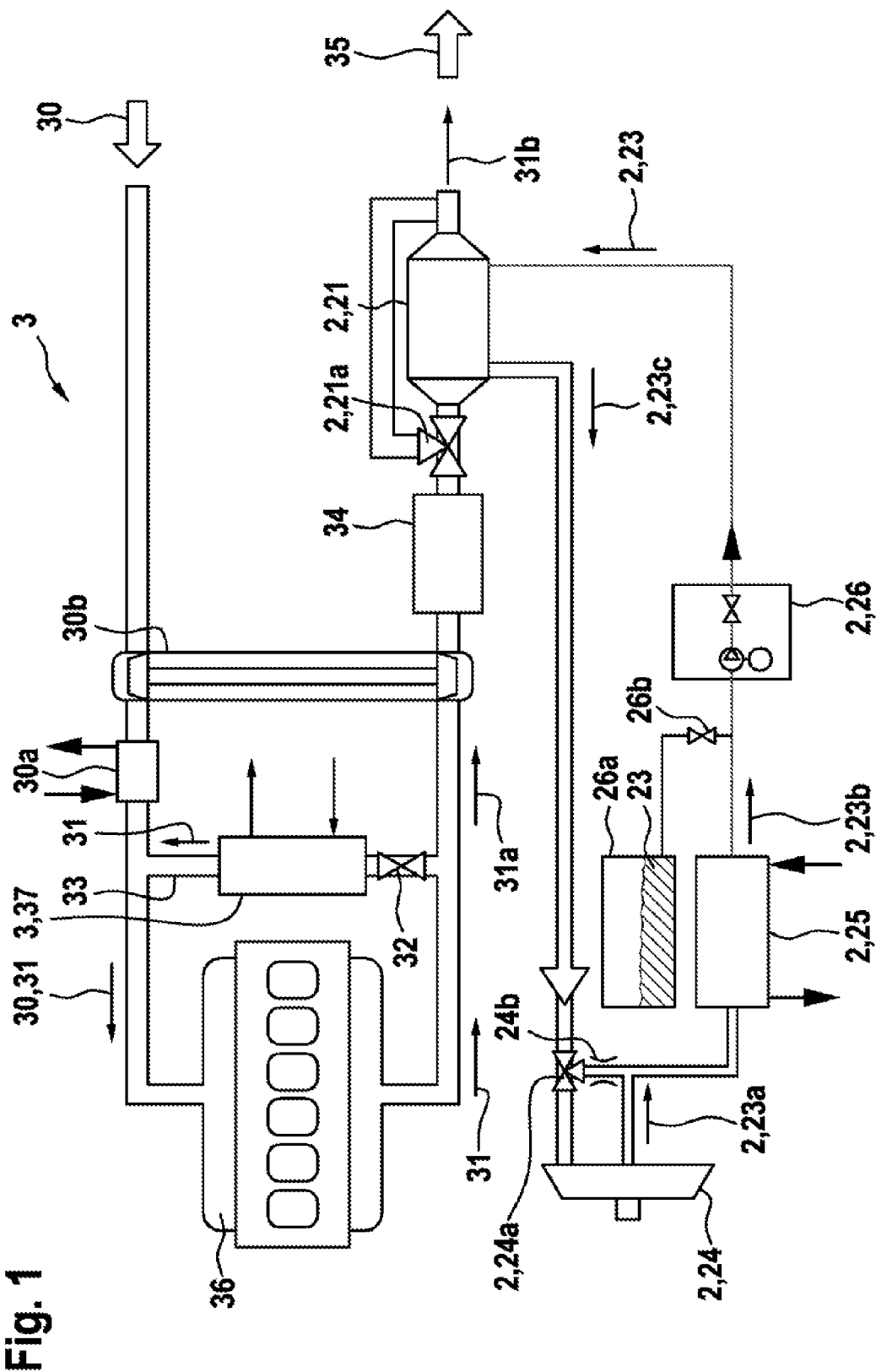
FIG. 1 an exemplary integration of a waste heat recovery system 2 in a vehicle 3.

FIG. 1 shows how a waste heat recovery system 2 can be integrated by way of example in a vehicle 3. Combustion air 30 is taken in via a turbocharger 30b and cooled in an intercooler 30a, wherein the arrows at the intercooler 30a indicate the flow of the coolant. The combustion air is mixed with returned exhaust gas 31 from the exhaust gas return 33 and conducted into the engine 36.

In a manner controlled by the exhaust gas return valve 32, some of the exhaust gas 31 generated by the engine 36 is conducted back into the exhaust gas return 33, which is cooled by a cooler 37. Analogously to the intercooler 30a, the arrows at the cooler 37 indicate the flow of the coolant. The rest of the exhaust gas 31a which remains after the return of exhaust gas firstly drives the turbocharger 30b and is rendered harmless in the exhaust gas after-treatment 34 before heat is extracted from it in the evaporator 21. The cooled exhaust gas 31b is then fed to the exhaust 35. All or some of the exhaust gas 31a can be diverted around the evaporator 21 via an exhaust gas bypass valve 21a. The waste heat in the proportion of the exhaust gas 31a which does not pass through the evaporator 21 is conducted directly into the exhaust 35 of the vehicle 3.

In the evaporator 21, the working medium 23 is converted into superheated steam 23c and supplied to the expansion machine 24. The expanded working medium 23a is condensed into liquid working medium 23b in the condenser 25, wherein the flow of the coolant is in turn indicated by the arrows at the condenser 25. The condensed working medium 23b is compressed again in the delivery device 26 and returned to the evaporator 21.

Some of the superheated steam 24a can be conducted past the expansion machine 24 into the bypass throttle 24b via the bypass valve 24a. It can thus be prevented that superheated steam 23c with an inadequate steam quality arrives in the expansion machine 24 and damages it. If steam 23c is conducted into the bypass throttle 24b, the energy contained therein is not used to drive the expansion machine 24 and is instead lost.

The working medium 23 is supplied to the waste heat recovery system 2 from a tank 26a in a manner controlled by a tank valve 26b.

Figure 2:
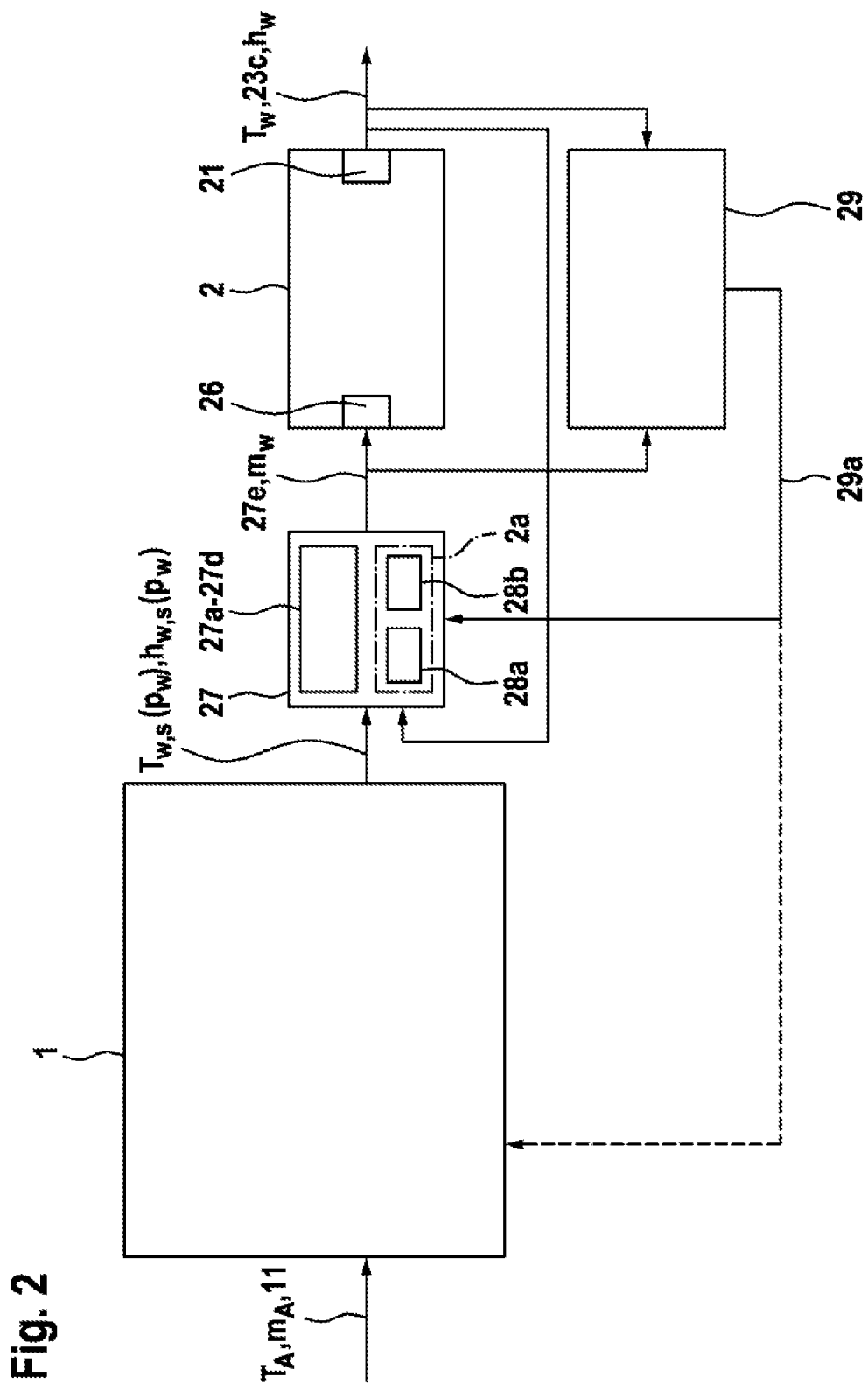
FIG. 2 an interaction of the control circuit 27 with a performance optimizer 1 and with the waste heat recovery system 2.

FIG. 2 shows the interaction of the control circuit 27 with the waste heat recovery system 2 and with a performance optimizer 1 connected upstream. In this example, the performance optimizer 1 retains the temperature $T_A$ and the mass flow rate $m_A$ of the exhaust gas 31a at the site of the evaporator 21 as input variables 11. From these, the performance optimizer 1 determines the set value $T_{W,S}(p_W)$ for the temperature $T_W$ of the working medium 23c at the entry into the expansion machine 24, or the set value $h_{W,S}(p_W)$ for the specific enthalpy $h_W$ of the working medium 23c at the entry into the expansion machine 24, in each case as a function of the pressure $p_W$ of the working medium 23c. The set values $T_{W,S}(p_W)$, or $h_{W,S}(p_W)$, are the defaults for the control circuit 27.

The control circuit 27 is designed to regulate the control deviations 27a-27d, which are combined in a common cost function, and to output control variables 27e for this purpose. In the example shown in FIG. 2, this is primarily the mass flow rate mw of the working medium 23, which is adjusted via the delivery rate of the delivery device 26. When the delivered working medium 23 passes through the evaporator 21, it is converted into superheated steam 23c with a temperature $T_W$ and a specific enthalpy $h_W$. The temperature $T_W$ and the specific enthalpy $h_W$ are supplied to the control circuit 27 as feedback.

Based on a model 2a of the waste heat recovery system 2, the control circuit 27 contains a prediction module 28a, which is designed to precalculate the future development of the specific enthalpy $h_W$, or the temperature $T_W$. This serves to preplan the control interventions 27e and therefore lessen the effect of the inertia in the waste heat recovery system 2 between a control intervention 27e and the arrival of the resultant feedback. This increases the likelihood of the control being able to avoid activating the bypass valves 21a and/or 24a, in particular to avoid the violation of hard system restrictions.

The optimization module 28b which determines the control interventions 27e as a solution of a quadratic program with quadratic restrictions is likewise based on the model 2a. A Kalman filter 29 is provided to determine further state variables 29a appearing in the model 2a from the accessible variables. The additional state variables 29a are supplied to the control circuit 27 and optionally also to the performance optimizer 1. The performance optimizer 1 can use, for example, the same model 2a of the waste heat recovery system 2 as the control circuit 27.

Figure 3:
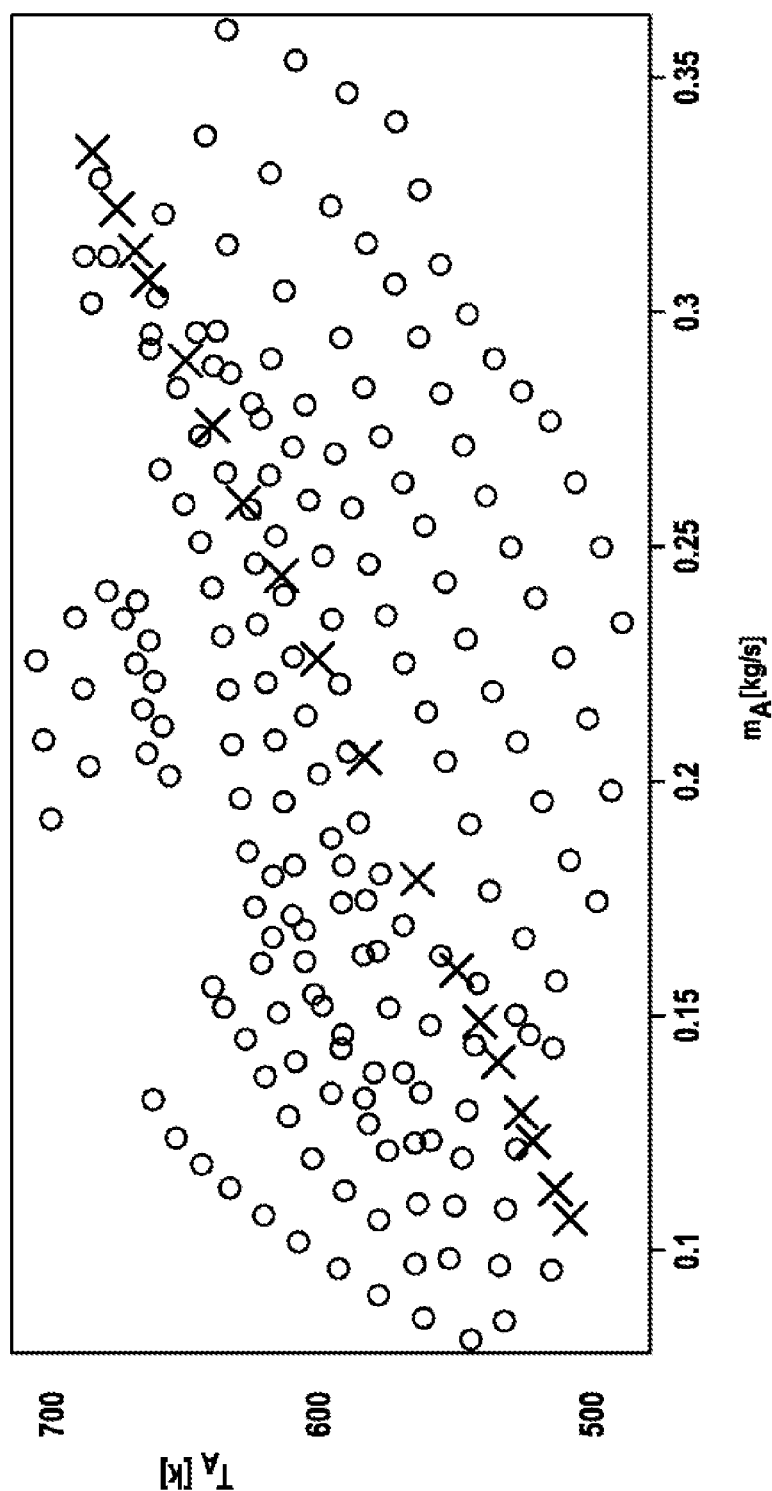
FIG. 3 a selection of nominal operating points for the sectional linearization of a model 2a of the waste heat recovery system 2.

FIG. 3 shows an exemplary plot of the temperature $T_A$ of the exhaust gas 31a at the entry of the evaporator 21 against the associated mass flow rate $M_A$. Measured stationary engine operation points are marked with circles. The nominal operating points selected along a straight line in the characteristic map for piecewise linearization of the model 2a are marked with crosses.

Figure 4:
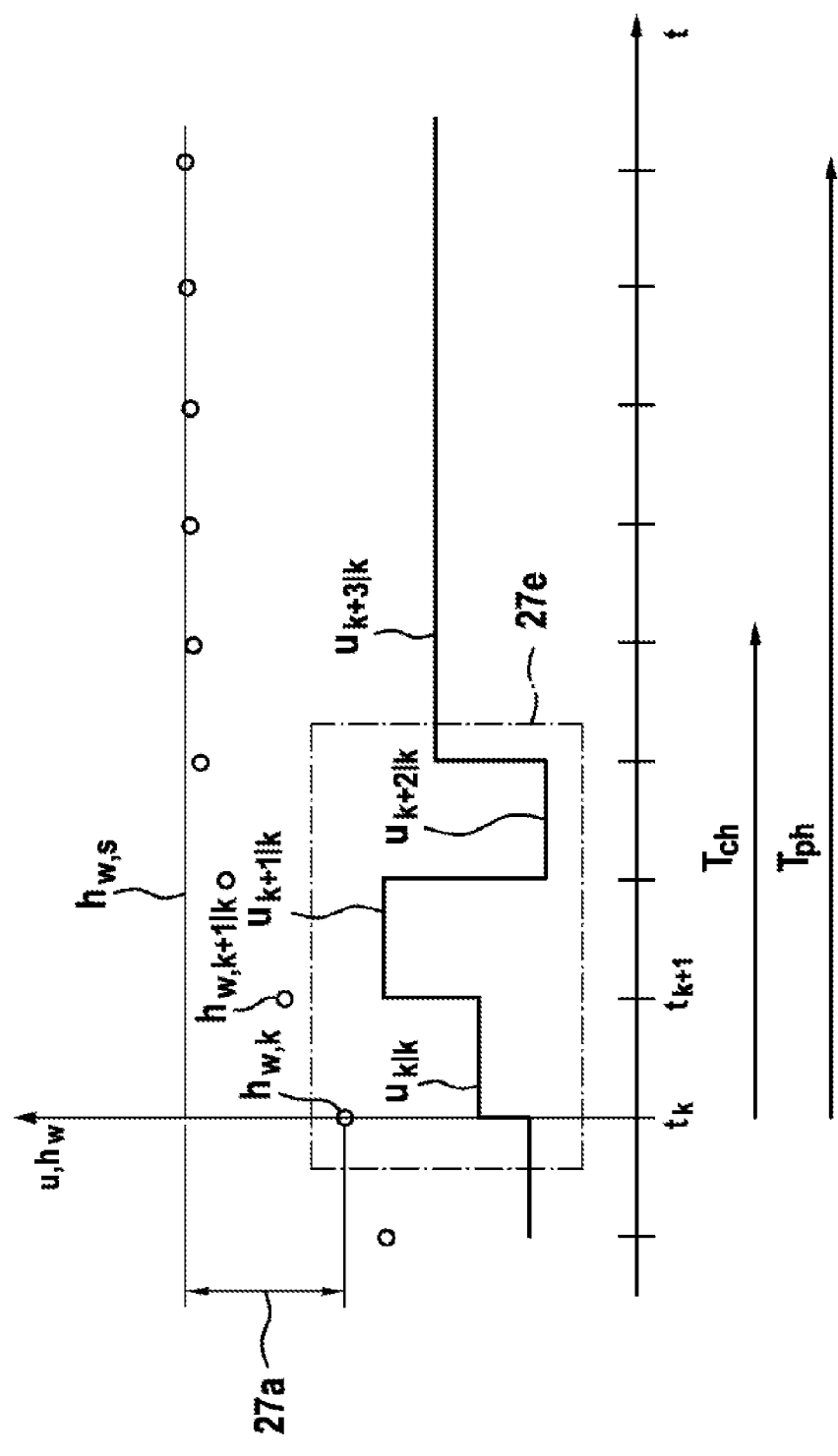
FIG. 4 an exemplary control horizon $T_{ch}$ and prediction horizon $T_{ph}$ of a model-predictive control in the control circuit 27.

FIG. 4 shows, by way of example, how to regulate a control deviation 27a, existing at the time $t_K$, between the actual specific enthalpy $h_{W,K}$ and the set value $h_{W,S}$ within a prediction horizon $T_{ph}$ with a sequence of preplanned control interventions 27e which take place within a control horizon $T_{ch}$. The control variable u is firstly deflected sharply upwards in two steps ($u_{k|k}$ and $u_{k+1|k}$) to quickly reduce the original control deviation 27a. To prevent an overshoot above the set value $h_{W,S}$, an intervention then ($u_{k+2|k}$) takes place in the opposite direction before the control variable u is finally ($u_{k+3|k}$) stabilized to an intermediate level.

Without the model-predictive control, the control variable u would have to approach its final value substantially more slowly in order to avoid overshooting it.

The invention claimed is:

1. A control circuit (27) for a waste heat recovery system (2) for a heat engine (36), wherein the waste heat recovery system (2) comprises at least one evaporator (21) for converting waste heat from exhaust gas (31, 31a) generated by the heat engine (36) into a working medium (23), at least one expansion machine (24), which can be driven by the working medium (23), at least one condenser (25) for condensing the working medium (23a) expanded in the expansion machine (24) into a liquid state (23b) and at least one delivery device (26) for increasing a pressure of the condensed working medium (23b) and delivering it into the evaporator (21), wherein the control circuit (27) controls at least one control variable which controls (a) an energy transfer from the exhaust gas (31, 31a) to the working medium (23b), (b) an energy transfer from the working medium (23c) to the expansion machine (24), or both (a) and (b), wherein the control circuit (27) is configured to regulate a specific enthalpy $h_W$, a temperature $T_W$, or both the specific enthalpy $h_W$ and the temperature $T_W$ of the working medium (23c) entering the expansion machine (24) to a set value $h_{W,S}$, $T_{W,S}$, or to set values $h_{W,S}$ and $T_{W,S}$, wherein the set value $h_{W,S}$, $T_{W,S}$, or both, as applicable, depends on the pressure $p_W$ of the working medium (23c) entering the expansion machine (24), and a prediction module (28a) is provided, which is designed to precalculate a future development of the specific enthalpy $h_W$, of the temperature $T_W$ or the pressure $p_W$, on the basis of a model (2a) and at least one set of state variables of the waste heat recovery system (2).

2. The control circuit (27) as claimed in claim 1, wherein the control circuit (27) is coupled to a performance optimizer (1), which is configured to determine a dependence of the set value $h_{W,S}$, $T_{W,S}$ on the pressure $p_W$ from optimal operating points of the waste heat recovery system (2).

3. The control circuit (27) as claimed in claim 2, wherein the performance optimizer (1) is designed to associate a stationary working point of the waste heat recovery system (2) which has an optimal efficiency with a set of state variables of the heat engine (36) from which at least a temperature $T_A$ and a mass flow rate $m_A$ of the exhaust gas (31, 31a) at the site of the evaporator (21) arise.

4. The control circuit (27) as claimed in claim 1, wherein, in the control circuit (27), in addition to a control deviation (27a) of the specific enthalpy $h_W$, or the temperature $T_W$, from the set value $h_{W,S}$, or $T_{W,S}$,
a proportion of the exhaust gas (31, 31a) which is not conducted through the evaporator (21) also acts as a further control deviation (27b) and/or
a frequency and/or an intensity of control interventions of the control circuit (27) also acts as a further control deviation (27c) and/or
a control deviation (27a) of the specific enthalpy $h_W$, or of the temperature $T_W$, from the set value $h_{W,S}$, or $T_{W,S}$, which exceeds a predetermined threshold value, also acts as a further control deviation (27d).

5. The control circuit (27) as claimed in claim 1, wherein the control circuit (27) is designed to plan future control interventions (27e) within a time control horizon $T_{ch}$ in such a way that control deviations (27a-27d) to be expected at a time which is a prediction horizon $T_{ph} > T_{ch}$ in the future are minimized.

6. The control circuit (27) as claimed in claim 1, wherein both the control horizon $T_{ch}$ and the prediction horizon $T_{ph}$ are defined as a multiple of a sampling time $T_S$, wherein the sampling time $T_S$ decreases with the increasing pressure $p_W$.

7. The control circuit (27) as claimed in claim 1, wherein the model (2a) is linearized around at least one stationary working point of the waste heat recovery system (2).

8. The control circuit (27) as claimed in claim 7, wherein the model (2a) is linearized in sections for different ranges of the pressure $p_W$.

9. The control circuit (27) as claimed in claim 1, wherein the control circuit is coupled to a Kalman filter (29) for estimating at least one state variable (29a) of the model (2a) from a set of measured state variables of the waste heat recovery system (2).

10. The control circuit (27) as claimed in claim 1, wherein an optimization module (28b) is provided, which is designed to determine the future control interventions (27e) as a solution of a mathematical optimization problem with side conditions, in particular in the form of a quadratic program with quadratic restrictions.

11. The control circuit (27) as claimed in claim 10, wherein a conversion module (28c) is provided, which is designed to convert boundary conditions, present in the form of inequalities, for the pressure $p_W$, for the temperature $T_W$, and/or for at least one control variable into quadratic restrictions.

12. The control circuit (27) as claimed in claim 1, wherein the control circuit (27) influences the position of at least one valve (21a) which guides all or some of the exhaust gas (31, 31a) past the evaporator (21), and/or influences the position of at least one valve (24a) which guides all or some of the working medium (23c) past the expansion machine (24).

13. A waste heat recovery system (2) for an internal combustion engine of a vehicle (3) as a heat engine (36), wherein the waste heat recovery system (2) comprises at least one evaporator (21) for converting waste heat from exhaust gas (31, 31a) generated by the internal combustion engine (36) into a working medium (23), at least one expansion machine (24) which can be driven by the working medium (23), at least one condenser (25) for condensing the working medium (23) expanded in the expansion machine (24) into the liquid state and at least one delivery device (26) for increasing pressure of the condensed working medium (23b) and delivering it to the evaporator (21), wherein the waste heat recovery system (2) has a control circuit (27) as claimed in claim 1.

14. A non-transitory, computer-readable medium, containing instructions which, when run on a computer, cause the computer to control a waste heat recovery system (2) for a heat engine (36), wherein the waste heat recovery system (2) comprises at least one evaporator (21) for converting waste heat from exhaust gas (31, 31a) generated by the heat engine (36) into a working medium (23), at least one expansion machine (24), which can be driven by the working medium (23), at least one condenser (25) for condensing the working medium (23a) expanded in the expansion machine (24) into a liquid state (23b) and at least one delivery device (26) for increasing pressure of the condensed working medium (23b) and delivering it into the evaporator (21), wherein the control circuit (27) controls at least one control variable which controls (a) energy transfer from the exhaust gas (31, 31a) to the working medium (23b), (b) the energy transfer from the working medium (23c) to the expansion machine (24), or both (a) and (b), by
regulating a specific enthalpy $h_W$, a temperature $T_W$, or both the specific enthalpy $h_W$ and the temperature $T_W$ of the working medium (23c) entering the expansion machine (24) to a set value $h_{W,S}$, $T_{W,S}$, or to set values $h_{W,S}$ and $T_{W,S}$, wherein the set value $h_{W,S}$, $T_{W,S}$, or both, as applicable, depends on the pressure $p_W$ of the working medium (23*c*) entering the expansion machine (24), and providing a prediction module (28*a*), which is designed to precalculate a future development of the specific enthalpy $h_W$, of the temperature $T_W$ or the pressure $p_W$, on the basis of a model (2*a*) and at least one set of state variables of the waste heat recovery system (2).

\* \* \* \* \*